United States Patent
Walker et al.

(10) Patent No.: US 8,463,940 B2
(45) Date of Patent: Jun. 11, 2013

(54) METHOD OF INDICATING A PATH IN A COMPUTER NETWORK

(75) Inventors: Anthony Paul Michael Walker, Fort Collins, CO (US); Shannon Beall Hill, Fort Collins, CO (US); Frank O. Trujillo, Broomfield, CO (US); Srikanth Natarajan, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1991 days.

(21) Appl. No.: 10/355,002

(22) Filed: Jan. 31, 2003

(65) Prior Publication Data

US 2004/0153572 A1    Aug. 5, 2004

(51) Int. Cl.
*G06F 15/173* (2006.01)

(52) U.S. Cl.
USPC .......................................................... 709/239

(58) Field of Classification Search
USPC ................... 709/223–226, 239; 370/217, 400
See application file for complete search history.

(56) References Cited

U.S. PATENT DOCUMENTS

| | | | | |
|---|---|---|---|---|
| 5,435,003 A | * | 7/1995 | Chng et al. | 714/4 |
| 5,956,339 A | * | 9/1999 | Harada et al. | 370/400 |
| 5,983,350 A | * | 11/1999 | Minear et al. | 726/11 |
| 6,003,090 A | * | 12/1999 | Puranik et al. | 709/235 |
| 6,061,723 A | * | 5/2000 | Walker et al. | 709/224 |
| 6,072,866 A | * | 6/2000 | Conan | 379/220.01 |
| 6,201,794 B1 | * | 3/2001 | Stewart et al. | 370/248 |
| 6,298,053 B1 | * | 10/2001 | Flammer et al. | 370/349 |
| 6,470,389 B1 | * | 10/2002 | Chung et al. | 709/227 |
| 6,747,957 B1 | * | 6/2004 | Pithawala et al. | 370/252 |
| 6,804,712 B1 | * | 10/2004 | Kracht | 709/223 |
| 6,813,634 B1 | * | 11/2004 | Ahmed | 709/224 |
| 6,836,463 B2 | * | 12/2004 | Garcia-Luna-Aceves et al. | 370/238 |
| 6,847,614 B2 | * | 1/2005 | Banker et al. | 370/252 |
| 6,934,249 B1 | * | 8/2005 | Bertin et al. | 370/218 |
| 6,977,908 B2 | * | 12/2005 | de Azevedo et al. | 370/254 |
| 6,980,548 B1 | * | 12/2005 | Zaccone et al. | 370/392 |
| 7,013,345 B1 | * | 3/2006 | Brown et al. | 709/236 |
| 7,185,045 B2 | * | 2/2007 | Ellis et al. | 709/200 |
| 2002/0004843 A1 | * | 1/2002 | Andersson et al. | 709/238 |
| 2002/0015386 A1 | * | 2/2002 | Kajiwara | 370/248 |
| 2002/0018449 A1 | * | 2/2002 | Ricciulli | 370/268 |
| 2002/0091857 A1 | * | 7/2002 | Conrad et al. | 709/238 |
| 2002/0143905 A1 | * | 10/2002 | Govindarajan et al. | 709/220 |
| 2002/0165981 A1 | * | 11/2002 | Basturk et al. | 709/242 |
| 2002/0181402 A1 | * | 12/2002 | Lemoff et al. | 370/238 |
| 2003/0041138 A1 | * | 2/2003 | Kampe et al. | 709/223 |
| 2003/0058789 A1 | * | 3/2003 | Sugawara et al. | 370/222 |
| 2003/0072271 A1 | * | 4/2003 | Simmons et al. | 370/255 |
| 2003/0163528 A1 | * | 8/2003 | Banerjee et al. | 709/205 |
| 2003/0189920 A1 | * | 10/2003 | Erami et al. | 370/351 |

(Continued)

OTHER PUBLICATIONS

Apostolopoulos et al. "On the Effectiveness of Path Pre-Computation in Reducing the Processing Cost of On-Demand QoS Path Computation"; IEEE; 1998.*

*Primary Examiner* — Sulaiman Nooristany (57) ABSTRACT

A background process is executed which dynamically determines nodes in a path from a start node to an end node. The background process examines a routing table of routing nodes in the path to determine changes in the path. Information regarding multiple paths between a first node and a second node of the network can be stored so that a point of primary failure can be more accurately determined.

22 Claims, 4 Drawing Sheets

U.S. PATENT DOCUMENTS

| | | |
|---|---|---|
| 2003/0191829 A1* | 10/2003 | Masters et al. ............... 709/223 |
| 2004/0030924 A1* | 2/2004 | Griswold ...................... 713/201 |
| 2004/0042402 A1* | 3/2004 | Galand et al. ................. 370/237 |
| 2004/0081166 A1* | 4/2004 | Stanforth et al. ........ 370/395.32 |
| 2004/0151121 A1 | 8/2004 | Natarajan et al. |
| 2004/0153568 A1 | 8/2004 | Ho et al. |
| 2004/0156321 A1 | 8/2004 | Walker et al. |

* cited by examiner

METHOD OF INDICATING A PATH IN A COMPUTER NETWORK

RELATED APPLICATIONS

The present application is related to the U.S. applications, "METHOD OF DETERMINING A MAXIMAL MESH", Natarajan et al., Ser. No. 10/354,991, "METHOD OF DETERMINING A MESH IN A COMPUTER NETWORK", Walker, et al., Ser. No. 10/355,062, and "METHOD OF STORING DATA CONCERNING A COMPUTER NETWORK" Ho et al., Ser. Number 10/355,118. Each of these application is are filed on the same day as the present application and is incorporated herein by reference.

BACKGROUND

Computer network nodes are often arranged in redundant arrangements to provide reliability. These redundant arrangements can make the analysis of the computer networks more difficult.

When failures occur in the computer network hardware, parts of the network can become inaccessible to other parts of the network, causing "down time". To address the "down time" network management software applications can be deployed to help anticipate failures and find a root cause of any failures which occur. An example of a network management software application is described in Walker et al., U.S. Pat. No. 6,061,723 "Network Management Event Correlation in Environments Containing Inoperative Networking Elements", incorporated herein by reference.

SUMMARY

In accordance with exemplary embodiments, a method of indicating a path in a computer network is provided wherein a background process is executed which dynamically determines additional nodes in a path from a first node to a second node. The additional nodes include a routing node. The background process dynamically examines a routing table in the routing node to determine changes in the path. Information is provided concerning the path, the information including an indication of the additional nodes.

A method of identifying a point of primary failure among nodes of a computer network includes storing information regarding plural paths between a first node and second node of the network. The information indicates a third node of the network on one of the plural paths. The second and third nodes are polled to determine their accessibility by the first node. The stored information and the accessibility of the second and third nodes are used to determine a point of primary failure.

An exemplary management computer can comprise a processor configured to execute a background process which dynamically determines additional nodes in a path from a first node to a second node. The additional nodes include a routing node. The background process dynamically examines a routing table in the routing node to determine changes in the path. The management computer includes a memory configured to store information concerning the path, the information including indications of the additional nodes.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF EXEMPLARY EMBODIMENTS

Figure 1:
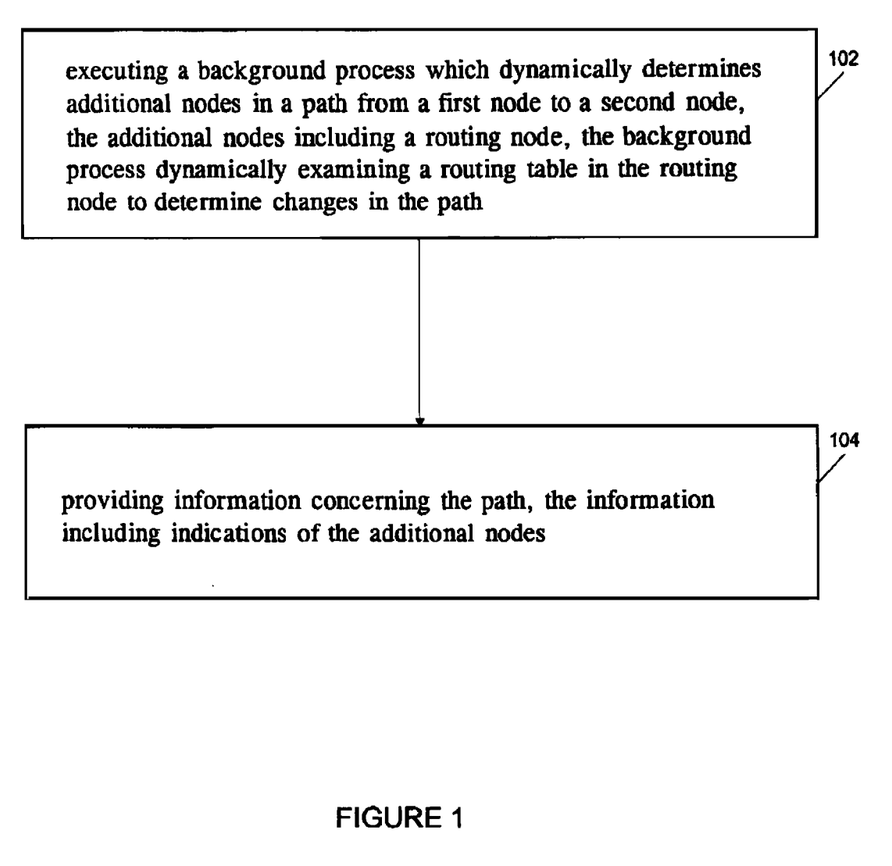
FIG. 1 is a flowchart illustrating a method for indicating a path of a computer network.

FIG. 1 is a flowchart illustrating a method of indicating a path of a computer network in accordance with an exemplary embodiment. The method can be implemented using a computer. Thus, a computer-readable medium can contain a program which executes the method for indicating the path in the computer network.

In step 102, a background process is executed which dynamically determines additional nodes in a path from a first node to a second node. As referenced herein, the term "dynamically" means that nodes are determined at any time during execution of the background process (e.g., periodically or at random intervals during the execution of the background process). The background process can be a daemon process such as those used with UNIX systems. The nodes can include end nodes; routing nodes, such as routers that operate using Internet Protocol (IP) Addresses; and non-routing nodes, such as switches that operate using link level addresses. As used herein, a "path" is a possible communicate link between the first node and the second node. The paths can include active path segments allowed by the current spanning tree, and/or path segments allowed by the network topology but not allowed by the current spanning tree. The background process can be a path server that provides path information to client processes.

The additional nodes can include a routing node. The background process dynamically examines a routing table in the routing node to determine changes in the path. As used herein, "routing table" refers to a table used by a routing node to route packets in a network and/or stored routing information maintained for a management protocol or for another purpose.

In step 104, information is provided concerning the path. The information includes an indication of the additional nodes.

In an exemplary embodiment, the background process is configured to use a network socket to provide information to another process. A network socket is one way of transferring information between the background process and another process.

Figure 2:
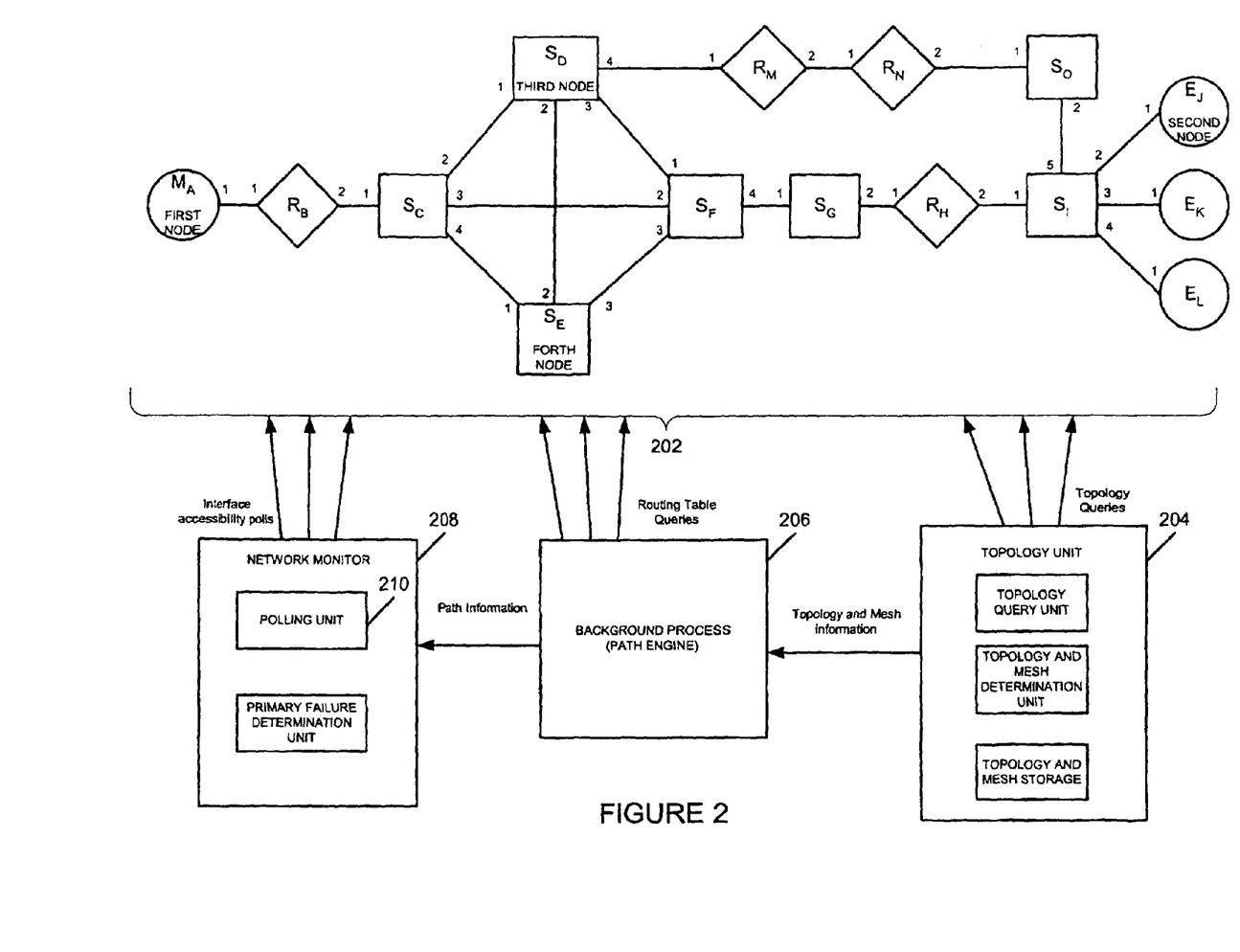
FIG. 2 is a diagram that illustrates a computer network and a system for diagnosing primary node failures in the computer network using a background process.

In the example of FIG. 2, a network monitor process 208 interacts with a background process 206 using a network socket. A listen port is created by the background process 206 over which the network monitor 208 can contact the background process 206. Once contact is made, a new temporary port for transferring information from the background process 206 and the network monitor 208 is created. In an exemplary embodiment, the port which can be, for example, port 3209, assigned by the Internet Assigned Number Authority (IANA), is used for the listen port.

The routing table can be accessed using a network management protocol. For example, the Simple Network Management Protocol (SNMP) can be used to access Management Information Base (MIB) data that indicates the contents of the routing table at the routing node. In the example of FIG. 2, the Path Engine background process 206 uses routing table queries to the routing node $R_B$ to determine routing information from its routing table. In one embodiment, the routing table is used to determine the next routing node in the path to the second node.

In an exemplary embodiment, the information provided concerning the path identifies interfaces of the additional nodes. In FIG. 2, for example, a path going from the first node $M_A$ to the second node $E_J$, can be indicated by interface 1 of $M_A$, interface 1 of $R_B$, interface 2 of $R_B$, interfaces 1 and 3 of $S_C$, interfaces 2 and 4 of $S_F$, interfaces 1 and 2 of $S_G$, interfaces 1 and 2 of $R_H$, interfaces 1 and 2 of $S_I$, and interface 1 of $E_J$.

The path information can include indications of any non-routing nodes in the path. In the above example, the indicated non-routing nodes of the path are nodes $S_C$, $S_F$, $S_G$, and $S_I$.

The non-routing nodes can be determined from a stored topology data. In the example of FIG. 2, the stored topology data is maintained by topology unit 204. For each pair of routing nodes, the background process 206 determines any of the non-routing nodes in a path from the first node to the second node that goes through this pair of routing nodes.

The path information can indicate plural paths from the first node to the second node. For example, in FIG. 2, in addition to the path segment from $S_C$ to $S_F$ to $S_G$, there is also a path segment from $S_C$ to $S_D$ to $S_F$ to $S_G$, as well as path from $S_C$ to $S_D$ to $S_E$ to $S_F$ to $S_G$. The use of the plural path information in the indication allows the system to better evaluate a system failure. In one example, the multiple paths each contain the same routing nodes with varying path segments of non-routing nodes.

In an exemplary embodiment, the system indicates whether there is any mesh included in the path. In the example of FIG. 2, the path information can indicate that a path goes through the mesh of nodes $S_C$, $S_D$, $S_F$, and $S_E$. The mesh information can be used to indicate the plural paths.

The path information can be provided to another process that polls the nodes to determine accessibility. In the example of FIG. 2, the polling unit 210 of the network monitor 208 polls the nodes to determine their accessibility. Each of the interfaces at the nodes can be polled to determine whether they are accessible.

In one embodiment, the process uses the path information to identify a point of primary failure. The information concerning the path helps to determine the point of primary failure.

An exemplary Background Process Flow is as follows:
Background Process Flow
initialize process
wait for network topology to be determined by topology unit
outer loop
  create listen socket
  wait for client unit (network monitor) to connect
  inner loop
    get command from client unit
    upon a new node discovery, get list of routing nodes and end nodes in computer network from topology unit
    for each routing node and end node in the list loop
      Compute Composite Path and send to client if socket is bad, break to outer loop sleep
    if there is a new discovery clear node cache In this example, the process initialization step involves integrating the process with the system. For example, when the background process is to be used with the Hewlett-Packard OpenView environment, integration can be performed at the initialization of the background process, for starting and stopping the background process and for obtaining status information from the background process during operation.

In a next step, the process waits for the network topology to be determined by the topology unit. FIG. 2 illustrates an example in which topology unit 204 queries the nodes in the computer network 202 to produce a stored network topology. The background process 206 waits until the topology of the computer network is determined by this topology unit 204.

In the outer loop of the background process flow, the background process 206 creates a listen socket. A listen port socket can be created at port 3209. The path engine background process waits for the client to connect with this listen port. In the example of FIG. 2, the client is the network monitor 208, but any client can interact with the path engine background process using the listen port. When a client connects to the path engine background process, a temporary port number and socket connection is created. The outer loop of the background process flow is a way to establish a socket connection from the client process to the path engine background process. If the client disconnects, the path engine background process can reconnect to the client using the outer loop.

In the inner loop of the path engine background process, if there is a new node discovery, a list of the routing nodes and end nodes the computer network is obtained from the topology unit. For each routing node or end node in the list of the routing nodes obtained from the topology unit, the system loops and computes the composite path and sends this information to the client. If the socket is bad, the system breaks to the outer loop and creates a listen socket. In one example, the system can sleep for any desired time interval(s) (e.g., five seconds for the first time through the loop and twenty seconds the next time through the loop). If there is a new discovery, the node cache is cleared. The node cache stores path segment information of non-routing nodes.

An example of a Compute Composite Path procedure for determining a composite path is as follows:
Compute Composite Path
Find Active Route (using routing nodes)
for each pair of nodes found, get nodes from node cache
if node cache is empty or cleared,
  Determine Non-routing Nodes
  load non-routing nodes into node cache In this example, the Compute Composite Path procedure first finds an active route indicating the routing and end nodes from the first node to the second node. In an exemplary embodiment, the active route can be a route from the first node to the second node via a particular routing node or nodes (e.g., a route from first node $M_A$ to second node $E_J$ via routing nodes $R_B$ and $R_H$). For each pair of successive routing and/or end nodes in the route, non-routing nodes in a path between the nodes can be obtained from the node cache.

In an exemplary embodiment, the Compute Composite Path procedure is not called to identify paths to switching nodes. However, such a feature can, if desired, be performed using a management IP address of a switching node. If the node cache is empty or cleared, the non-routing nodes can be determined from stored topology data. Non-routing nodes which are found can be loaded into the node cache.

An example of a Find Active Route procedure to identify the routing nodes in a given route to an end node is as follows:

Find Active Route
    set current IP address to management unit IP address until next hop is end node
        check routing table at current IP address using network management protocol
        determine next hop to end node from routing table
        add next hop to active route list
        set current IP address to next hop
    return active route list This exemplary Find Active Route procedure operates by setting the current IP address to the first node (management computer) IP address. Until the next node is the second node, a routing table at the current IP address is checked using a network management protocol, such as the Simple Network Management Protocol.

In one embodiment, the routing table is checked by examining a number of different possible subnets stored in the routing table. In one example, a shifting subnet mask can be used to determine a most specific IP address match in the routing table (e.g., the most specific IP address match). An exemplary examining of the routing table using subnets is also discussed in the U.S. patent application Natarajan et al. "Method of Computing a Path Between Two Nodes in a Network", Ser. No. 10/154,912, filed May 28, 2002, incorporated herein by reference. In one example, a 32 bit subNet-Mask (e.g., 32 "1's") is first used and it is checked to see if a next hop entry exists in the routing table. If not, the mask is left shifted and comparisons are made until a next hop entry is found. When a specific NextHop is found (e.g., the most specific NextHop entry in the table), the procedure checks the routing table at the NextHop.

The IP address of the next routing node or end node (next hop) in the path to the second node is determined from the routing table. The next hop is added to the active route list, and the current IP address is set to the next hop IP address. The loop is continued until the next hop is the second node. When the next hop is the second node, the active route list is returned to the Compute Composite Path.

An example of a Determine Non-Routing Nodes procedure (e.g., to find switching nodes between each pair of successive routing nodes and/or end nodes) is as follows:

Determine Non-Routing Nodes
    set the first node of the pair as a newly found node until second node of pair is a newly found node
        set the last found nodes to the newly found nodes
        check topology database to find connected nodes connected to last found nodes
        set connected nodes that are not on the visited node list as the newly found nodes
        determine partial path segment history for each newly found node
        set partial path segment history for second node of pair as path segment history
        check path segment history against stored alternate path (mesh) information to determine an alternate path (mesh)
        insert alternate path indications (mesh information) into path segment history
    return path segment history In this example, the Determine Non-Routing Nodes procedure receives a pair of routing nodes or a routing node and an end node. The first node of the pair is set as the newly-found node. Until the second node of the pair is found, the process loops. The newly found nodes are set as the last-found nodes. The topology database is checked to find nodes connected to the last-found nodes. The connected nodes that are not on a visited node list are set as the newly-found nodes, and the partial path segment for each newly-found node is determined. The partial path segment is a path segment from the first node of the pair to the newly-found node. When the second node of the pair is a newly-found node, a partial path segment history for the second node of the pair is set as the path segment history.

The path segment history is then checked to determine alternate paths. In one embodiment, this alternate path information is mesh information that describes meshes of nodes within the computer network. Alternate path indications can be inserted into the path segment history. In one embodiment, indications of a mesh are also inserted into the path segment history. The path segment history is then returned to the Compute Composite Path procedure.

The non-routing nodes can be determined by checking a topology database that indicates the interconnections between the non-routing nodes. That is, the interconnections between the different switching, but non-routing, nodes in the computer network can be stored in a database. As shown in FIG. 2, this information can be stored as a result of topology queries to the different nodes produced by the topology unit 204.

The determination of the non-routing nodes in one embodiment uses a pair of routing nodes. Starting from the first node of the pair, nodes connected to that first node are found. The procedure can then go to find the nodes that are connected to nodes that are connected to the start node. The process then continues until a first path between the first and second nodes of the pair is found. In one embodiment, when the path can be found, this path is used to determine stored alternate paths or meshes.

In the FIG. 2 example, the background process 206 initializes, waits for the network topology to be set up by the topology unit 204, creates a listen socket, and waits for instructions from the network monitor 208 to connect. Once a command is received from the network monitor 208, the background process 206 awaits discovery of a new node by the topology unit 204. When a new node is determined, a list of the routing nodes in the computer network is obtained from the topology unit. In this example, the routing nodes would include routing nodes $R_B$, $R_M$, $R_N$, $R_H$.

The system computes a composite route to the routing nodes. In one example, when the composite path to $E_J$ is produced, the background process 206, using the IP Address of the node $E_J$, checks the routing table at the management node $M_A$. This indicates the routing node $R_B$. The routing table of $R_B$ indicates the second routing table $R_H$. The routing table at the routing node $R_H$ indicates the node $E_J$. The determination of the next routing node in the path can be achieved using management queries from the background process 206 to the routing tables. Dynamic changes to the routing tables can be found using the background process 206. For example, if the system were to change to route through routing nodes $R_M$ and $R_N$ to get the node $E_J$, these changes would be found by the queries produced by the background process 206.

Along the route between the pair of routing nodes $R_B$ and $R_H$, the non-routing nodes are determined. These non-routing nodes can be determined by checking the topology unit 204. In the example of FIG. 2, the topology unit 204 is checked to see which nodes connect to the first node of the pair $R_B$. It is found that node $S_C$ is connected to $R_B$. Then it is determined which nodes are connected to $S_C$. These include nodes $S_D$, $S_E$ and $S_F$. The nodes that connect to these nodes that have not been found before include nodes $R_M$ and $S_G$. Since $R_M$ is a routing node, no additional nodes connected to this routing node are checked in the non-routing node check. Node $R_H$ is connected to node $S_G$. The path $S_C$, $S_F$, $S_G$ is the path segment determined between the router $R_B$ and $R_H$. Next it is determined whether there are any alternate paths or mesh information in the mesh information storage of the topology unit 204. In this example, the mesh of the nodes $\{S_C, S_D, S_F, S_E\}$ is found and an indication of this mesh is inserted in the path information.

The network monitor 208 can be located at the management computer $M_A$. The background process 206 can be located at the management computer $M_A$ or at another node in the computer network or a computer that can access the computer network. Topology unit 204 can be located at the management computer or at another location.

In one example, the background process 206 is the path engine used in the Hewlett-Packard OpenView Network Node Manager (NNM) available from Hewlett Packard of Palo Alto, CA. The background process 206 can be a path engine that interacts with the network monitor 208. The network monitor 208 can include its own topology store, an event correlator system and an event configurator system. The topology unit 204 can include a host NNM unit, discovery process (DISCO), a combination element (RENDEVOUS), a topology database (OVET_MODEL), as well as the mesh discovery unit. Descriptions of the mesh discovery are described in the U.S. patent applications "METHOD OF DETERMINING A MAXIMAL MESH" (Natarajan et al., Ser. No. 10/354,991) and "METHOD OF DETERMINING A MESH IN A COMPUTER NETWORK" (Walker et al., Ser. No. 10/355,062), which are incorporated herein by reference. Interconnections between the network monitor 208 and the topology unit 204 can be performed using a translator (e.g., a bridge) for consistent labeling of the nodes and interfaces in the system.

Since the background process 206 can do active routing table queries to the routing nodes, the system will correctly operate with VLAN systems which use a special VLAN switch card, such as Cisco RSM card, placed within a switch. The VLAN switch card includes a router which has a single port connection for all of the VLANs. Since the background process 206 determines each of the routing nodes, the VLAN switch card can be found as a routing node. The remainder of the switch can be found as a non-routing node.

In one embodiment, the information transferred between the background process 206 and the network monitor 208 can be extensible mark-up language blocks (XML blocks). In one embodiment, the indications of a plural path can be indicated by XML tags. For example, XML tags can be used to indicate a mesh. In one embodiment, all of the interface connections of the mesh are produced in between the XML tags indicating the mesh. Thus, once the path is determined, segments which are part of a mesh can be replaced by the mesh indication.

Figure 3:
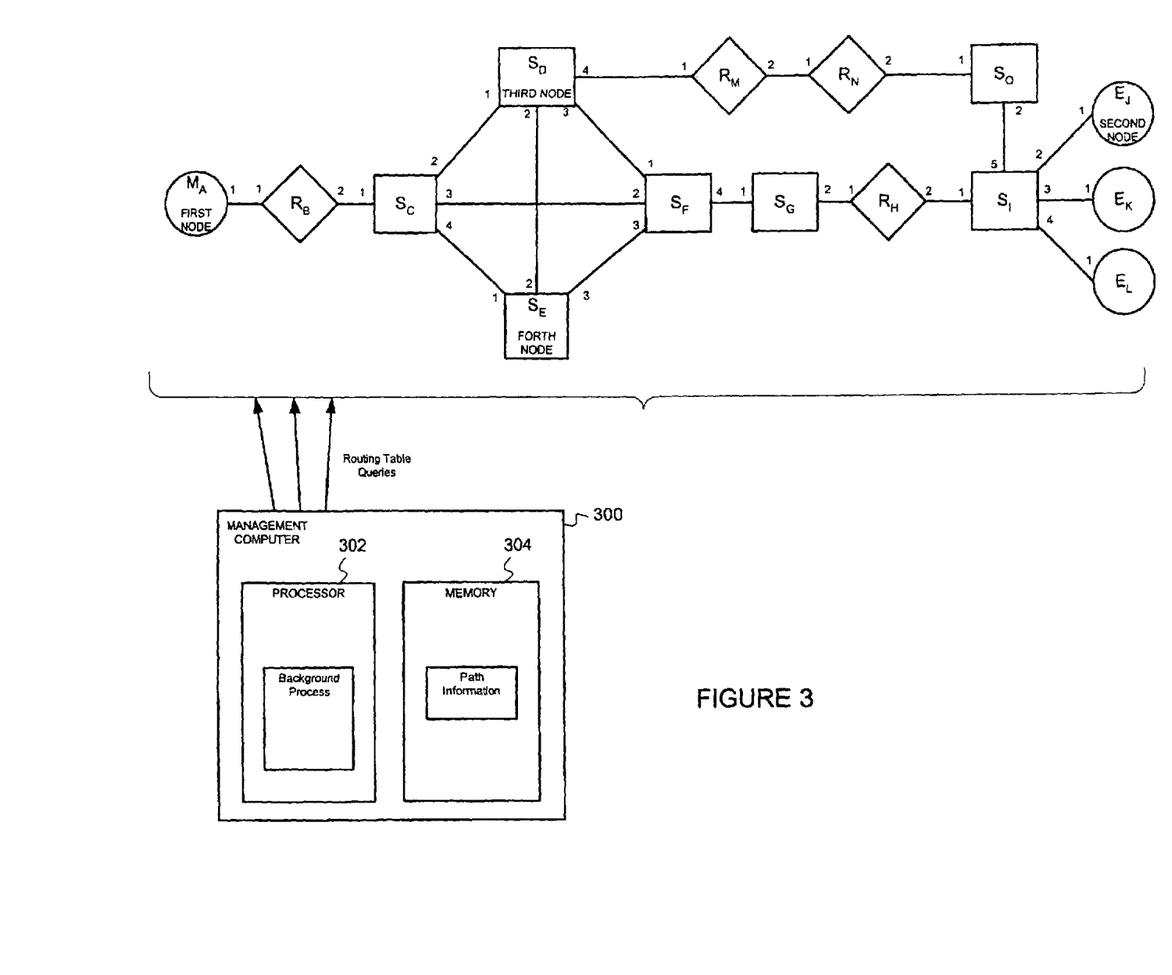
FIG. 3 is a diagram that illustrates a management computer executing a background process.

FIG. 3 illustrates a management computer according to an exemplary embodiment. The management computer 300 includes a processor 302 configured to execute a background process which dynamically determines additional nodes in a path from a first node to a second node, where the additional nodes can include a routing node. The background process dynamically examines a routing table in the routing node to determine changes in the path. The management computer 300 includes a memory 304 configured to store information concerning the path, where the information can include indications of the additional nodes.

The information can be stored temporarily or permanently. The memory can store the information for transfer to another process operating at the computer or another location. The memory can be a buffer which stores the information before the information's use by another process. The memory can store the information for a network socket.

Figure 4:
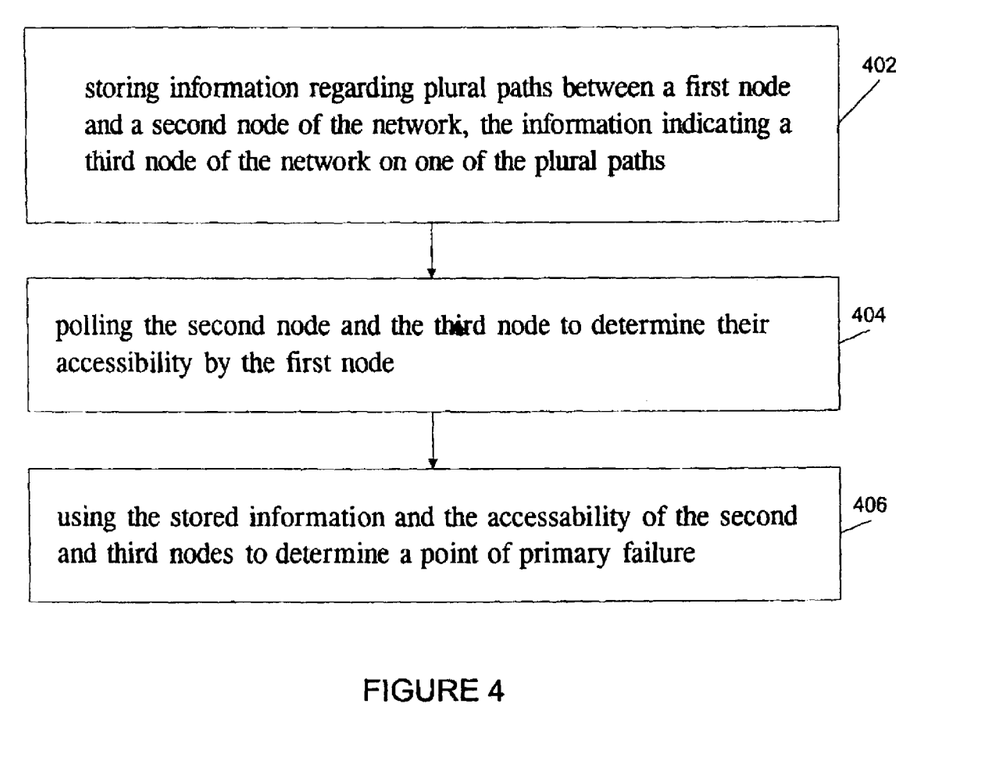
FIG. 4 is a flowchart that illustrates a method of identifying a point of primary failure among nodes of the computer network.

FIG. 4 illustrates a method of identifying a point of primary failure among nodes of a computer network. The method can be implemented using a computer. A computer-readable medium can contain a program which executes the method.

In step 402, information is stored regarding plural paths between a first node and a second node of the network. The information can indicate a third node in the network on one of the plural paths. Paths allowed by the network topology can be considered to be a path whether or not a current spanning tree can be polled to determine their accessibility by the first node, in step 404. In step 406, the stored information and the accessibility of the second and third node are used to determine a point of primary failure.

In the example of FIG. 2, information concerning plural paths between the first node $M_A$ and the second node $E_J$ are stored. In one embodiment, these plural paths include the path $M_A$, $R_B$, $S_C$, $S_F$, $S_G$, $R_H$, $S_I$, $E_J$ and the path $M_A$, $R_B$, $S_C$, $S_D$, $S_F$, $S_G$, $R_H$, $S_I$, $E_J$. In this example, the second node $E_J$ and third node $S_D$ are polled to determine the accessibility from the first node $M_A$. If node $S_D$ is accessible while node $S_J$ is inaccessible, this indicates that most likely the primary failure is not at interface 1 of $S_C$. Information about the accessibility of each interface, as well as indications of all the alternate paths through the non-routing nodes can be stored so that the correct determination of the point of primary failure can be done.

In an exemplary embodiment, the information indicates plural paths by indicating a mesh. In the example of FIG. 2, the mesh $S_C$, $S_D$, $S_E$, $S_F$ can be stored and can indicate the plural paths.

In an exemplary embodiment, the information indicates interfaces of the nodes. The information can include indications of any non-routing nodes in the plural paths between the first and second nodes.

Additional information of a path between the first node and the fourth node can be stored. In the example of FIG. 4, a path through fourth node $S_C$ is stored. This additional information can be used to determine a point of primary failure. The fourth node $S_C$ can be polled to determine its accessibility by the first node $M_A$.

An example of a Determine Primary Failure procedure is as follows:

Determine Primary Failure
poll all of the nodes (interfaces) in a computer network to determine accessible and inaccessible nodes (interfaces)
if any nodes (interfaces) are inaccessible, for each current inaccessible node (interface)
if there is a path through accessible nodes (interfaces) in the critical route to the current inaccessible node, the failure is a primary failure
if there is not path through accessible nodes (interfaces) in the critical route to the current inaccessible node, the failure is a secondary failure In this example, all of the interfaces in the computer network are polled to determine the accessible and inaccessible nodes from the first node ($M_A$). If any of the interfaces are inaccessible, for each of the inaccessible nodes it is checked to see whether there is a path through accessible interfaces in the critical route (path or paths between first and second node) to the current inaccessible node. If so, the failure is a primary failure. If there is not a path through accessible interfaces in the critical route to the current inaccessible node, the failure is a secondary failure.

In the example of FIG. 2, assume a failure at interface 3 of $S_C$ and a failure at interface 1 of $S_I$. A spanning tree in the non-routing nodes between the routing nodes $R_B$ and $R_H$ can be used to avoid loops. The spanning tree will set a root node, such as node $S_F$. This root node will run the spanning tree algorithm and will turn off some of the interfaces. For example, the spanning tree algorithm may turn off interfaces 2 and 4 on switch $S_C$, turn off interfaces 1 and 2 on switch $S_D$, and turn off interfaces 1 and 2 on switch $S_E$.

Until the spanning tree is changed, the failure at the interface 3 of the switch $S_C$ is a primary failure since neither node $E_J$ nor any other interfaces in the path to node $E_J$ are accessible from $M_A$ while the interfaces 1 and 2 of $R_B$ as well as interface 1 of $S_C$ are accessible.

The failure at interface 3 of $S_C$ can be determined by the spanning tree algorithm. The spanning tree algorithm can then produce a modified spanning tree, such as the spanning tree that connects $S_F$ to $S_D$ and then connects $S_D$ to $S_C$, rather than directly connecting between $S_C$ to $S_F$. When the spanning tree reroutes, the failure at interface 3 of $S_C$ is not a primary failure since additional interfaces in the path toward the second node $E_J$ are now accessible. For example, interface 2 of $S_C$, interfaces 1 and 3 of $S_D$, interfaces 1 and 4 of $S_F$, and interfaces 1 and 2 of $S_G$ are now accessible. Thus, interface 3 of $S_C$, once the spanning tree is rearranged, is not indicated as being a primary failure. Additionally, since the information concerns multiple paths, the different arrangements of the spanning tree can be anticipated. For example, a report of a primary failure at interface 3 of $S_C$ can be delayed since it is possible that the spanning tree algorithm will reconfigure around the interface 3 of switch $S_C$.

The different paths indicated by the information may not all be active at one time. Using the spanning tree algorithm only one path segment can be set active. The other paths will be inactive but can be set active by a modification of the spanning tree.

In the example of FIG. 2, once the spanning tree routes around the failed interface 3 of $S_C$, the failure at interface 1 of $S_I$ is indicated as the primary failure. It is possible that the routing node $R_B$ will route around the interface 1 of $S_I$ by going through routers $R_M$ and $R_N$. Until this dynamic change occurs however, the failure at interface 1 of $S_I$ is a primary failure since there is a path of accessible interfaces up to the interface 1 of $S_I$. Thus, exemplary embodiments can acquire information concerning plural paths which allows the system to accurately determine a point of primary failure.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A method of indicating a path in a computer network, comprising:
    executing a background process that, after initialization, waits for network topology to be determined by a topology unit, creates a listen socket, waits for a client unit to connect, receives a command from the client unit and upon a new node discovery dynamically determines additional nodes in a path from a first node to a second node, the additional nodes including a routing node and a non-routine node, the non-routine node determined from stored topology data, the background process dynamically examining a routing table in the routing node to determine changes in the path, the path includes active path segments allowed by a current spanning tree and path segments allowed by a network topology but not allowed by the current spanning tree;
    providing information concerning the path to another process that polls nodes, the information including indications of the additional nodes, wherein the another process identifies a point of primary failure in the computer network based on the indications of the additional nodes and information regarding plural paths that exist between the first node and the second node; and
    providing the information to another process that polls nodes to determine the nodes' accessibility.

2. The method of claim 1, wherein the background process is configured to use a network socket to provide the information to another process.

3. The method of claim 1, wherein the routing table is accessed using a network management protocol.

4. The method of claim 1, wherein the information identifies interfaces of the additional nodes.

5. The method of claim 1, wherein the information indicates a mesh included in the path.

6. A computer-based method of identifying a point of primary failure among nodes of a computer network, comprising:
    executing background process that, after initialization, waits for network topology to be determined by a topology unit, creates a listen socket, waits for a client unit to connect receives a command from the client unit and u on a new node discovery dynamically determines additional nodes in a path from a first node to a second node;
    storing information regarding plural paths between the first node and the second node of the network, the information indicating a third node of the network on one of the plural paths;
    polling the second node and the third node by another process to determine their accessibility by the first node;
    using the stored information and the accessibility of the second and third nodes to determine a point of primary failure for computer-based network monitoring; and
    indicating whether a primary failure or a secondary failure has occurred based on the determination of a point of primary failure, wherein the another process identifies a point of primary failure in the computer network based on the indication of the third node and the stored information;
    wherein the information includes indications of any non-routing nodes in the plural paths between the first and second node, the non-routing node determined from stored topology data, wherein the plural paths include active path segments allowed by a current spanning tree and path segments allowed by a network topology but not allowed by the current spanning tree.

7. The method of claim 6, wherein the information indicates plural paths by indicating a mesh.

8. The method of claim 6, wherein the information identifies interfaces of the nodes.

9. The method of claim 6, wherein additional information of a path between the first node and a fourth node is stored.

10. The method of claim 9, wherein the additional information is used to determine the point of primary failure.

11. The method of claim 10, wherein the fourth node is polled to determine its accessibility by the first node.

12. A non-transitory computer-readable medium comprising a program which executes the following procedure for indicating a path in a computer network:
    executing a background process that, after initialization, waits for network topology to be determined by a topology unit, creates a listen socket, waits for a client unit to connect, receives a command from the client unit and upon a new node discovery dynamically determines additional nodes in a path from a first node to a second node, the additional nodes including a routing node, the background process dynamically examining a routing table in the routing node to determine changes in the path, the path includes active path segments allowed by a current spanning tree and path segments allowed by a network topology but not allowed by the current spanning tree; and providing information concerning the path to another process that polls nodes, the information including indications of the additional nodes, wherein the another process identifies a point of primary failure in the computer network based on the indications of the additional nodes and information regarding plural paths that are present between the first node and the second node;

wherein the information includes indications of a non-routing node in the path, the non-routing node determined from stored topology data.

13. The non-transitory computer-readable medium of claim 12, wherein the background process is configured to use a network socket to provide the information to another process.

14. The non-transitory computer-readable medium of claim 12, wherein the routing table is accessed using a network management protocol.

15. The non-transitory computer-readable medium of claim 12, wherein the information identifies interfaces of the additional nodes.

16. The non-transitory computer-readable medium of claim 12, wherein the information indicates a mesh included in the path.

17. The non-transitory computer-readable medium of claim 12, wherein the information is provided to another process that polls nodes to determine their accessibility.

18. A management computer comprising:

a processor configured to execute a background process that, after initialization, waits for network topology to be determined by a topology unit, creates a listen socket, waits for a client unit to connect receives a command from the client unit and upon a new node discovery dynamically determines additional nodes in a path from a first node to a second node, the additional nodes including a routing node and a non-routing node, the non-routing node determined from stored topology data, the background process dynamically examining a routing table in the routing node to determine changes in the path, the path includes active path segments allowed by a current spanning tree and path segments allowed by a network topology but not allowed by the current spanning tree; and a memory configured to store information concerning the path, the information including indications of the additional nodes, wherein another process that polls nodes identifies a point of primary failure in a computer network based on the indications of the additional nodes and information regarding plural paths existing between the first node and the second node;

wherein the information is provided to a different process that polls nodes to determine their accessibility.

19. The management computer of claim 18, wherein the background process is configured to use a network socket to provide the information to another process.

20. The management computer of claim 18, wherein the routing table is accessed using a network management protocol.

21. The management computer of claim 18, wherein the information identifies interfaces of the additional nodes.

22. The management computer of claim 18, wherein the information indicates a mesh included in the path.

* * * * *

UNITED STATES PATENT AND TRADEMARK OFFICE
CERTIFICATE OF CORRECTION

PATENT NO. : 8,463,940 B2  
APPLICATION NO. : 10/355002  
DATED : June 11, 2013  
INVENTOR(S) : Anthony Paul Michael Walker et al.

Page 1 of 1

It is certified that error appears in the above-identified patent and that said Letters Patent is hereby corrected as shown below:

In the Claims:

In column 9, line 64, in Claim 1, after "a" delete "non-routine" and insert -- non-routing --, therefor.

In column 9, line 64, in Claim 1, after "the" delete "non-routine" and insert -- non-routing --, therefor.

In column 10, line 25, in Claim 6, after "executing" insert -- a --.

In column 10, line 28, in Claim 6, delete "connect" and insert -- connect, --, therefor.

In column 10, lines 28-29, in Claim 6, delete "u on" and insert -- upon --, therefor.

In column 12, line 5, in Claim 18, delete "connect" and insert -- connect, --, therefor.

Signed and Sealed this  
Twenty-ninth Day of October, 2013

Teresa Stanek Rea  
*Deputy Director of the United States Patent and Trademark Office*